United States Patent
Michalec

(10) Patent No.: US 11,453,325 B1
(45) Date of Patent: Sep. 27, 2022

(54) TAILGATE RAMP

(71) Applicant: David Michalec, Houston, TX (US)

(72) Inventor: David Michalec, Houston, TX (US)

( * ) Notice: Subject to any disclaimer, the term of this patent is extended or adjusted under 35 U.S.C. 154(b) by 0 days.

(21) Appl. No.: 17/063,759

(22) Filed: Oct. 6, 2020

(51) Int. Cl.
*B60P 1/43* (2006.01)
*B62D 33/03* (2006.01)

(52) U.S. Cl.
CPC .............. *B60P 1/435* (2013.01); *B62D 33/03* (2013.01)

(58) Field of Classification Search
CPC ................................ B60P 1/435; B62D 33/03
USPC .......................................................... 296/61
See application file for complete search history.

(56) References Cited

U.S. PATENT DOCUMENTS

| | | | |
|---|---|---|---|
| 5,907,276 A | 5/1999 | Lance | |
| 6,722,721 B2 | 4/2004 | Sherrer | |
| 6,746,068 B1 | 6/2004 | Hurd | |
| 7,445,268 B2 | 11/2008 | Faulkiner | |
| 7,549,692 B2 * | 6/2009 | Washington | B60P 1/435 296/61 |
| 7,976,264 B1 * | 7/2011 | Pope | B60P 1/431 414/480 |
| 8,511,734 B2 * | 8/2013 | Hutchins, Jr | B62D 33/0273 296/61 |
| 9,199,569 B2 | 12/2015 | Justak | |
| D777,399 S | 1/2017 | Adriani | |
| 9,902,306 B1 | 2/2018 | Foss | |
| 9,925,905 B2 * | 3/2018 | Adriani | B60P 1/435 |
| 2007/0261181 A1 | 11/2007 | Willard | |

FOREIGN PATENT DOCUMENTS

CA 2281322 3/2001

* cited by examiner

*Primary Examiner* — Joseph D. Pape
(74) *Attorney, Agent, or Firm* — Kyle A. Fletcher, Esq.

(57) ABSTRACT

The tailgate ramp includes a tailgate, a left ramp, and a right ramp. The left ramp and the right ramp may be operable to form inclined planes extending from the ground to a truck bed of a pickup truck or from the ground to the tailgate of the pickup truck. A cargo may be moved between the pickup truck and the ground by advancing the cargo over the left ramp and the right ramp. As non-limiting examples, the cargo may be a motorcycle, an ATV, or a lawnmower. Folding ramp assemblies of the left ramp and the right ramp may be folded and stored within a ramp storage cavity of the tailgate when not in use. The folding ramp assemblies of the left ramp the right ramp may be removed from the tailgate and unfolded for use.

19 Claims, 6 Drawing Sheets

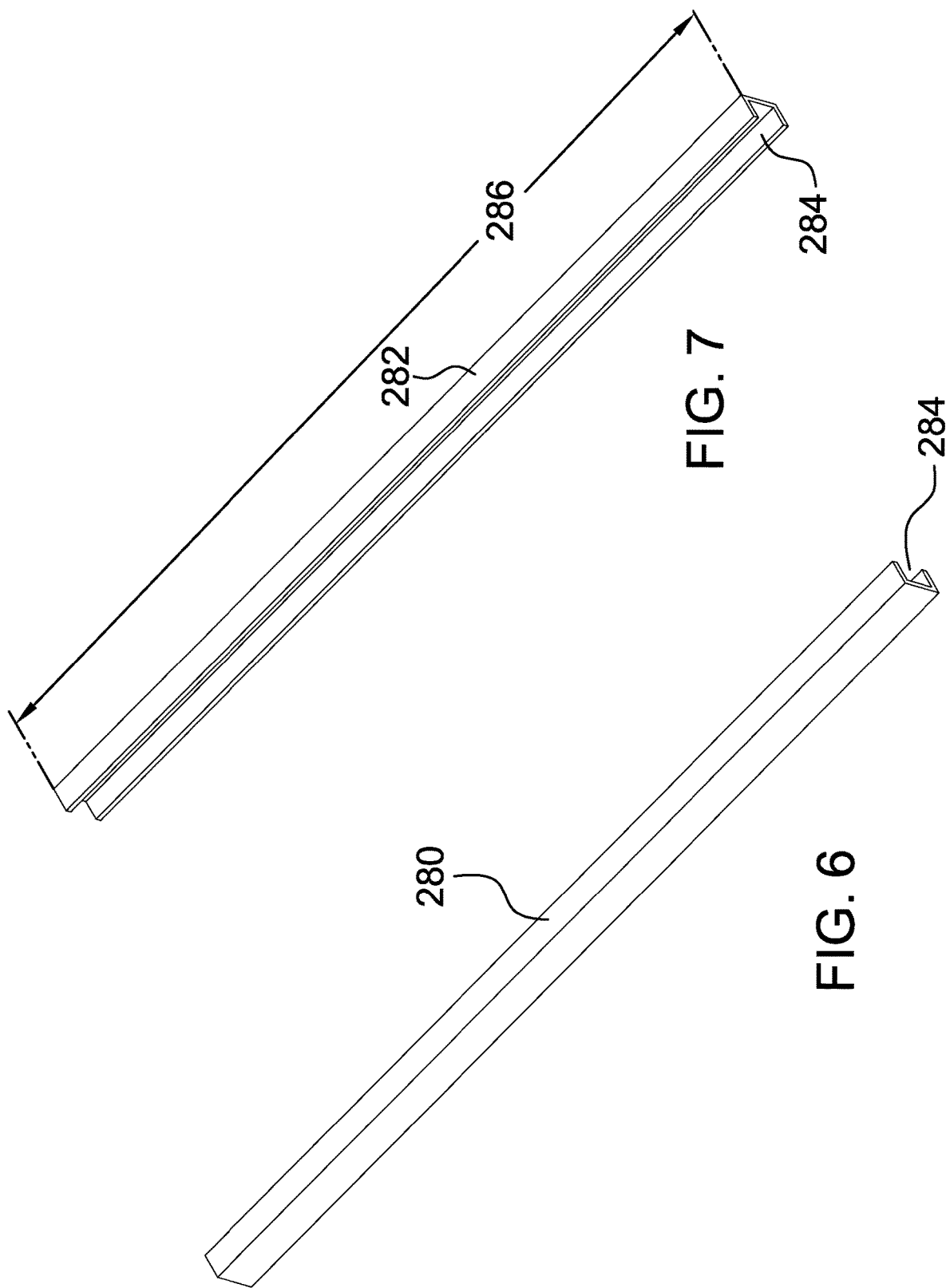

TAILGATE RAMP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicular accessories, more specifically, a tailgate ramp.

SUMMARY OF INVENTION

The tailgate ramp includes a tailgate, a left ramp, and a right ramp. The left ramp and the right ramp may be operable to form inclined planes extending from the ground to a truck bed of a pickup truck or from the ground to the tailgate of the pickup truck. A cargo may be moved between the pickup truck and the ground by advancing the cargo over the left ramp and the right ramp. As non-limiting examples, the cargo may be a motorcycle, an ATV, or a lawnmower. Folding ramp assemblies of the left ramp and the right ramp may be folded and stored within a ramp storage cavity of the tailgate when not in use. The folding ramp assemblies of the left ramp the right ramp may be removed from the tailgate and unfolded for use.

An object of the invention is to provide a left ramp and a right ramp that may be used individually or together to move a cargo between the ground and a truck bed.

Another object of the invention is to provide a cavity within the tailgate of a pickup truck for storing the folding ramps assemblies of the left ramp and the right ramp.

A further object of the invention is to provide a Z-bracket on each ramp that the ramp may support the ramp against the truck.

Yet another object of the invention is to provide a left side brace and a right side brace to stiffen each ramp.

These together with additional objects, features and advantages of the tailgate ramp will be readily apparent to those of ordinary skill in the art upon reading the following detailed description of the presently preferred, but nonetheless illustrative, embodiments when taken in conjunction with the accompanying drawings.

In this respect, before explaining the current embodiments of the tailgate ramp in detail, it is to be understood that the tailgate ramp is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tailgate ramp.

It is therefore important that the claims be regarded as including such equivalent construction insofar as they do not depart from the spirit and scope of the tailgate ramp. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 6 is a detail view of an embodiment of the disclosure illustrating the left side brace.

FIG. 7 is a detail view of an embodiment of the disclosure illustrating the right side brace.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
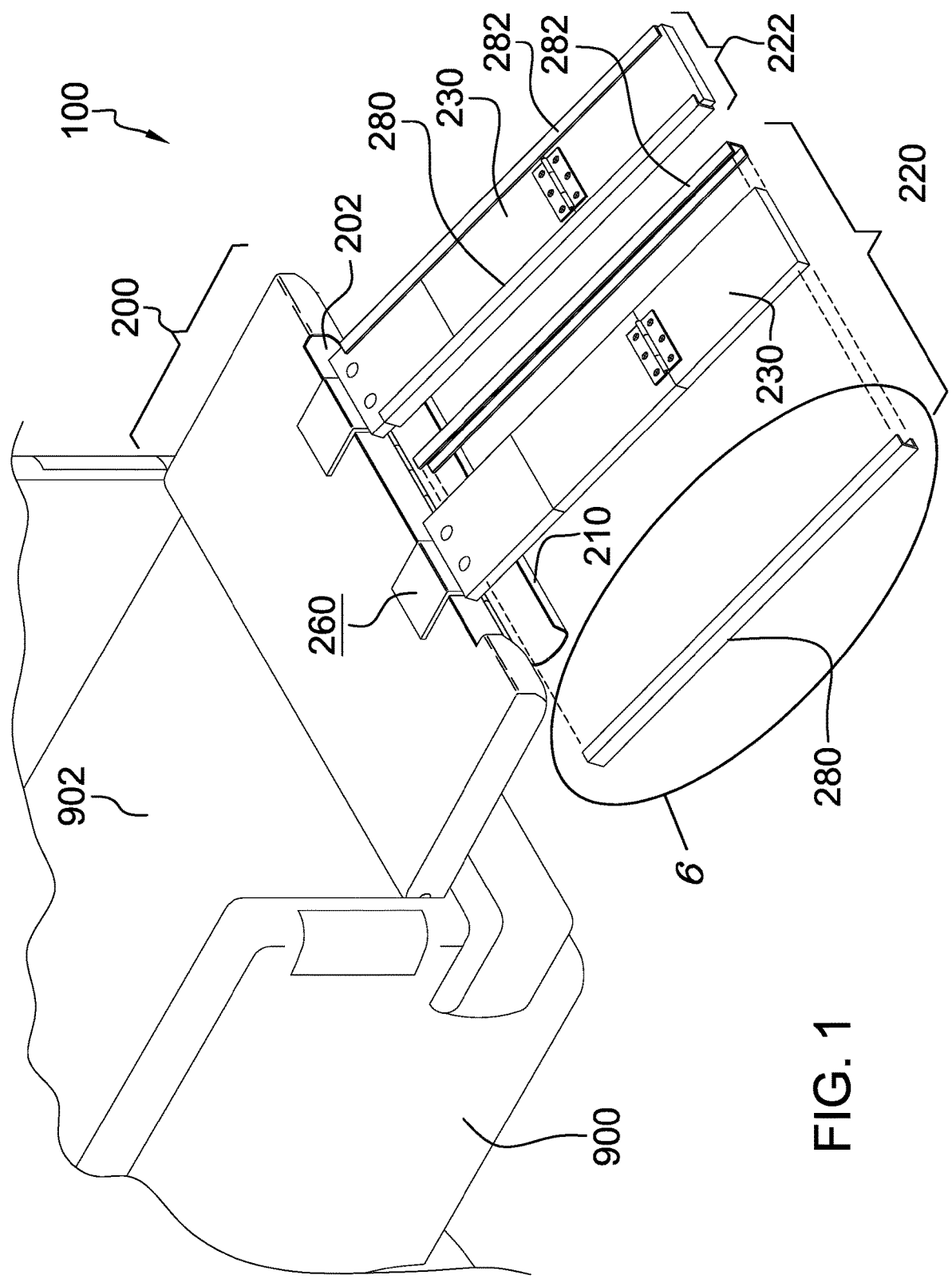
FIG. 1 is an isometric view of an embodiment of the disclosure illustrating the left ramp and the right ramp deployed for use.
Figure 2:
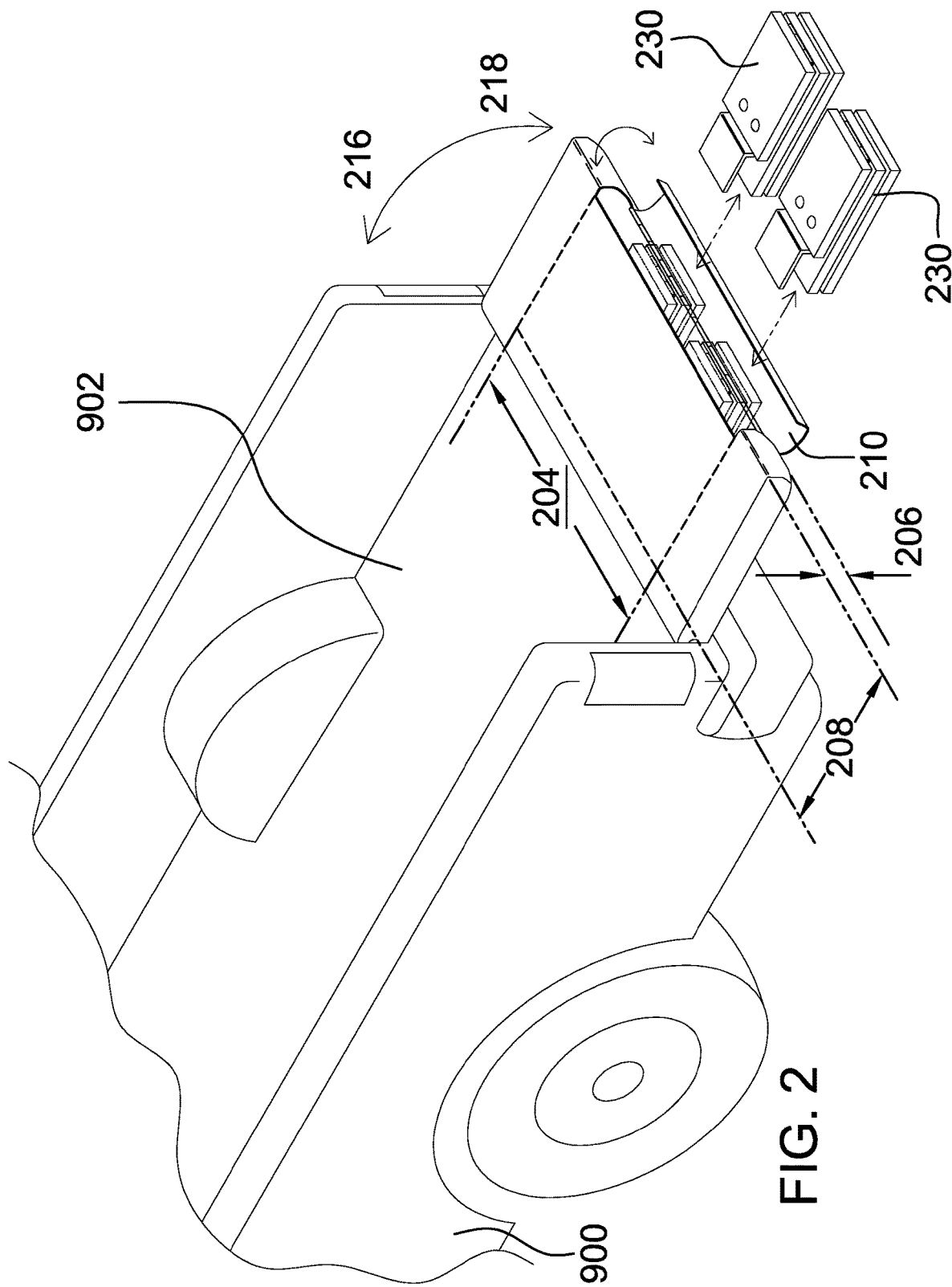
FIG. 2 is an isometric view of an embodiment of the disclosure illustrating the left ramp and the right ramp folded for storage within the tailgate.
Figure 3:
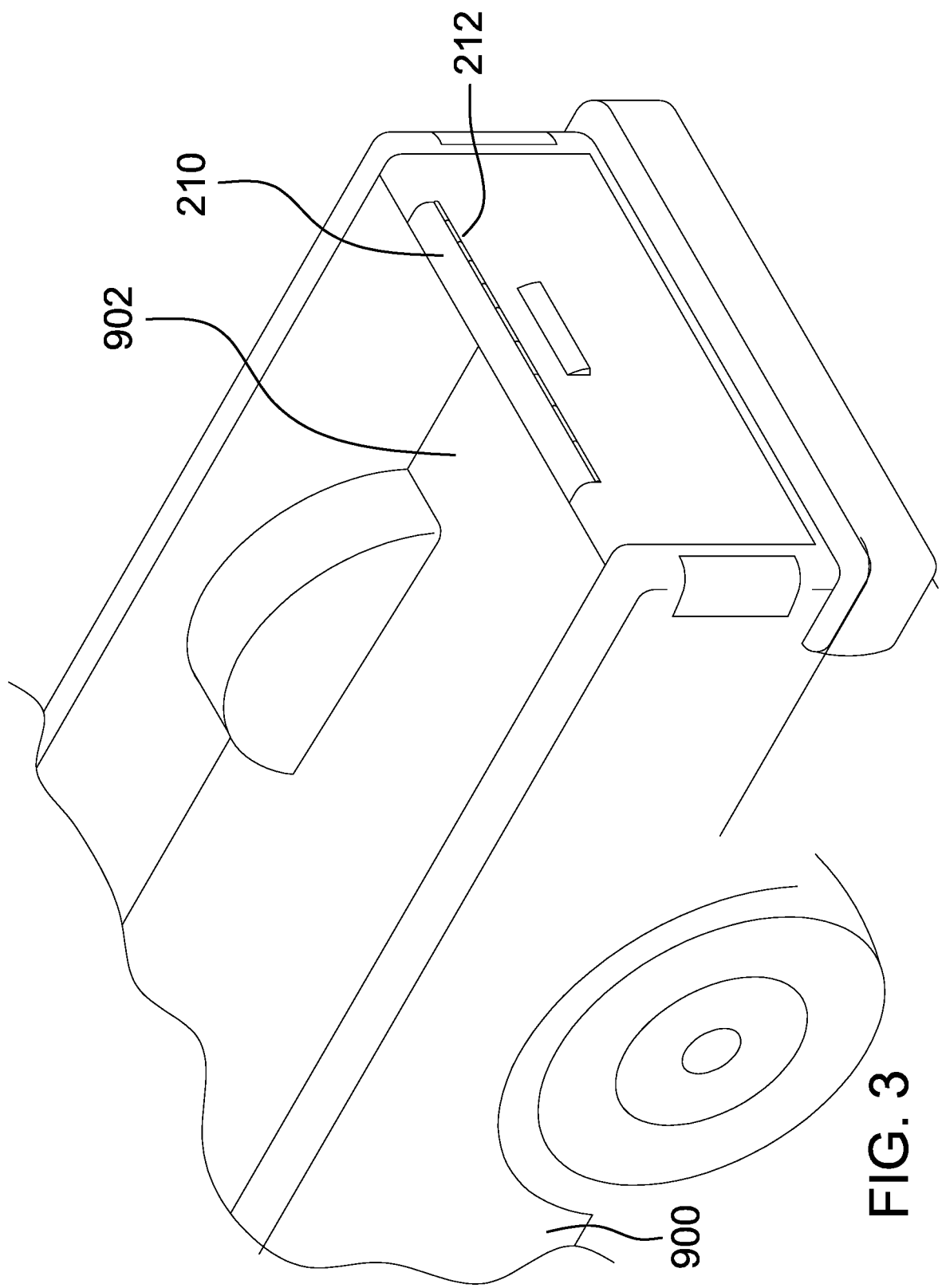
FIG. 3 is an isometric view of an embodiment of the disclosure illustrating the tailgate moved to the raised position.
Figure 4:
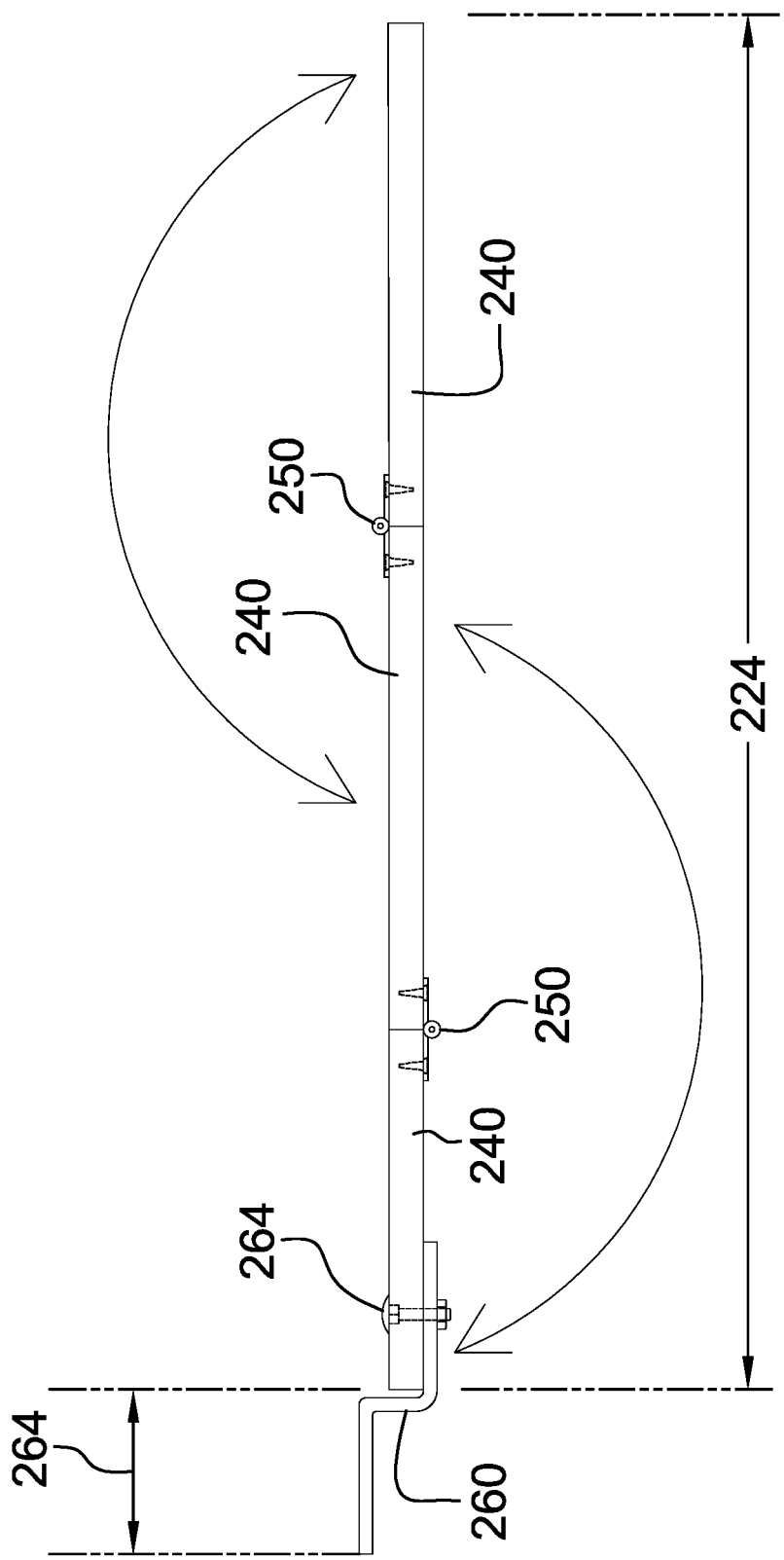
FIG. 4 is a detail view of an embodiment of the disclosure illustrating a folding ramp assembly.
Figure 5:
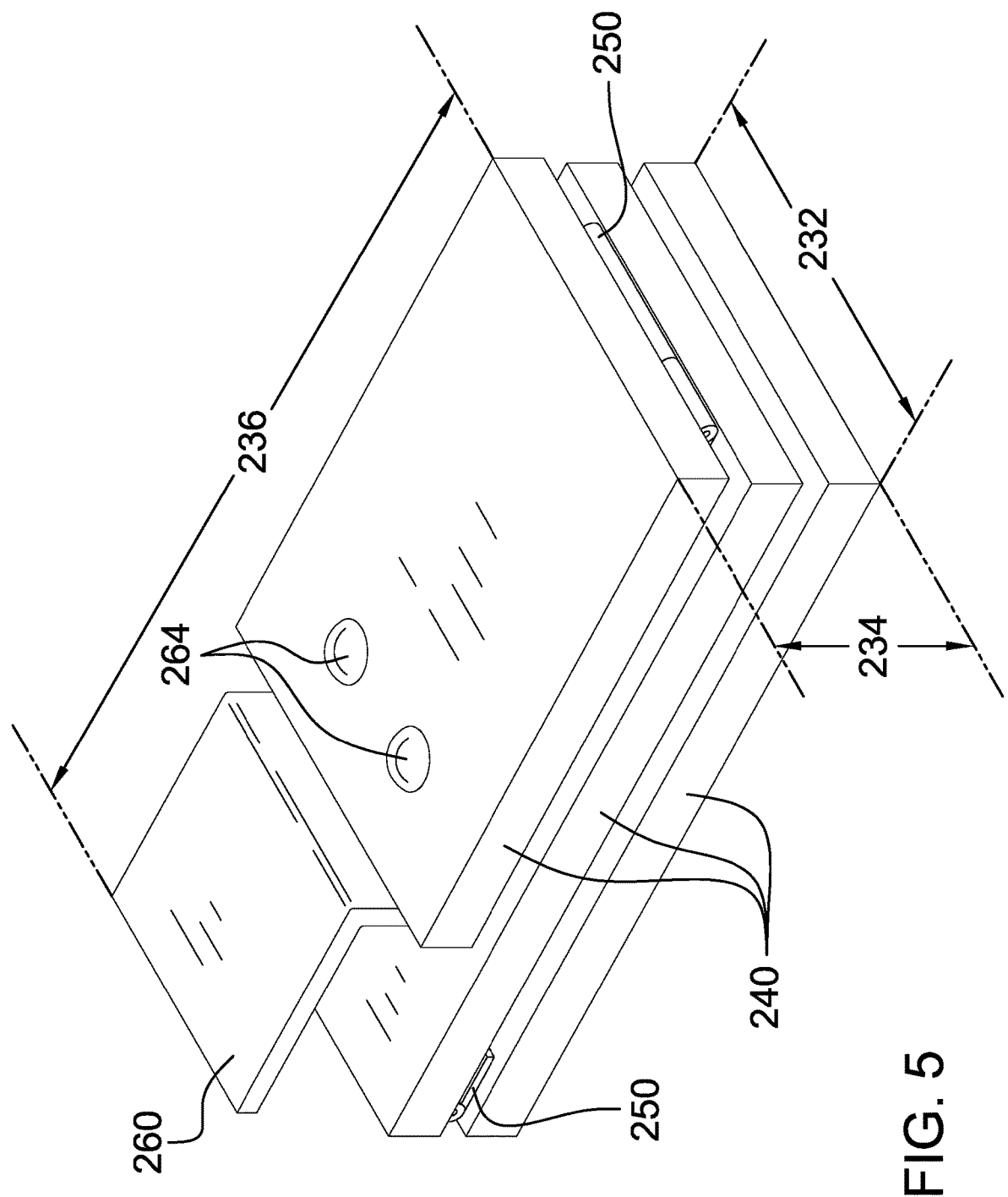
FIG. 5 is a detail view of an embodiment of the disclosure illustrating the folding ramp assembly folded for storage.

Detailed reference will now be made to a first potential embodiment of the disclosure, which is illustrated in FIGS. 1 through 7.

The tailgate ramp 100 (hereinafter invention) comprises a tailgate 200, a left ramp 220, and a right ramp 222. The left ramp 220 and the right ramp 222 may be operable to form inclined planes extending from the ground to a truck bed 902 of a pickup truck 900 or from the ground to the tailgate 200 of the pickup truck 900. A cargo may be moved between the pickup truck 900 and the ground by advancing the cargo over the left ramp 220 and the right ramp 222. As non-limiting examples, the cargo may be a motorcycle, an ATV, or a lawnmower. Folding ramp assemblies 230 of the left ramp 220 and the right ramp 222 may be folded and stored within a ramp storage cavity 202 of the tailgate 200 when not in use. The folding ramp assemblies 230 of the left ramp 220 and the right ramp 222 may be removed from the tailgate 200 and unfolded for use.

The tailgate 200 may comprise the ramp storage cavity 202 and a cavity cover 210. The tailgate 200 may be a pivoting rear wall of the truck bed 902. The tailgate 200 may hinge between a raised position 216 and a lowered position 218.

The ramp storage cavity 202 may be a plenum within the tailgate 200 for storing the left ramp 220 and the right ramp 222. The ramp storage cavity 202 may open at the top of the tailgate 200. Note that the top of the tailgate 200 is defined as the highest, narrow edge of the tailgate 200 when the tailgate 200 is in the raised position 216.

The folding ramp assemblies 230 of both the left ramp 220 and the right ramp 222 may fit within the ramp storage cavity 202 defined by a cavity height 206, a cavity width 204, and a cavity depth 208. Specifically, the cavity height 206 may be at least as high as a ramp height 234 of the folding ramp assembly 230 when the folding ramp assembly 230 is folded, the cavity width 204 may be at last twice as wide as a ramp width 232 of the folding ramp assembly 230, and the cavity depth 208 may be at least as deep as a ramp depth 236.

Alternatively, the cavity height 206 may be at least as high as the ramp height 234 of the folding ramp assembly 230 when the folding ramp assembly 230 is folded, the cavity width 204 may be at last twice as wide as the ramp depth 236 plus a Z-bracket overhang distance 262, and the cavity depth 208 may be at least as deep as the ramp width 232 of the folding ramp assembly 230.

The cavity cover 210 may enclose the open end of the ramp storage cavity 202 to retain the folding ramp assembly 230 of the left ramp 220 and the folding ramp assembly 230 of the right ramp 222 within the tailgate 200. The cavity cover 210 may hingedly couple to the tailgate 200 via a cover hinge 212.

The left ramp 220 and the right ramp 222 may be used individually or together to create a pathway for moving the cargo between the ground and the pickup truck 900. An individual ramp selected from the left ramp 220 and the right ramp 222 may be positioned with a Z-bracket 260 resting on the pickup truck 900 and the end of the individual ramp that is opposite the Z-bracket 260 resting on the ground.

The individual ramp may comprise the folding ramp assembly 230, a left side brace 280, and a right side brace 282. The left side brace 280 and the right side brace 282 may be longitudinally coupled to opposing sides of the folding ramp assembly 230, once unfolded, to form the individual ramp. The individual ramp may have an unfolded length 224 that is at least twice the vertical distance from the truck bed 902 to the ground. The unfolded length 224 of the left ramp 220 and the right ramp 222 may be the same.

The folding ramp assembly 230 may comprise a plurality of ramp sections 240, a plurality of ramp hinges 250, and the Z-bracket 260. The folding ramp assembly 230 may be accordion folded for storing and unfolded for use.

The plurality of ramp sections 240 may be rectangular plates of a rigid material that are coupled, end-to-end, by the plurality of ramp hinges 250. The width of the plurality of ramp sections 240 may determine the ramp width 232. The combined thickness of the plurality of ramp sections 240 may determine the ramp height 234 when the individual ramp folded. The longitudinal length of the plurality of ramp sections 240 may determine the ramp depth 236 when the individual ramp is folded. In some embodiments, the longitudinal length of individual sections of the plurality of ramp sections 240 may match the ramp depth 236 except that the topmost of the plurality of ramp sections 240 may be shortened by the Z-bracket overhang distance 262.

The plurality of ramp hinges 250 may be hinges that pivot through 180 degrees. The plurality of ramp hinges 250 may be located on alternating side of the joints between adjacent ramp sections such that the folding ramp assembly 230 may accordion fold. The Z-bracket 260 may couple to the upper end of the folding ramp assembly 230 using Z-bracket fasteners 264. One end of the Z-bracket 260 may extend beyond the folding ramp assembly 230 to provide a support for resting the individual ramp on the truck bed 902. In some embodiments, the Z-bracket fasteners 264 may be carriage bolts.

The left side brace 280 and the right side brace 282 may be rigid C-channels that may couple to the sides of the folding ramp assembly 230 to prevent collapse of the individual ramp. A length of an individual brace 286 selected from the left side brace 280 and the right side brace 282 is at least 90 percent of the longitudinal length of the folding ramp assembly 230 when the folding ramp assembly 230 is unfolded. The left side brace 280 and the right side brace 282 may be pressed onto the sides of the folding ramp assembly 230 such that the sides of the folding ramp assembly 230 are inserted into an interior of the channels 284 on both sides. In some embodiments, the left side brace 280 and the right side brace 282 may be stored within the ramp storage cavity 202 between the cavity cover 210 and the folding ramp assemblies 230, with the left side brace 280 and the right side brace 282 oriented laterally from one side of the pickup truck 900 to the other side of the pickup truck 900.

Throughout this document, the tailgate 200 is considered to be an extension of the truck bed 902 when the tailgate 200 is in the lowered position 218. Therefore, phrases such as "resting on the truck bed 902" may be considered to be equivalent to "resting on the truck bed 902 or the tailgate 200".

In use, the tailgate 200 may be move to the lowered position 218 and the cavity cover 210 of the tailgate 200 may be opened. The folding ramp assemblies 230 may be removed from the ramp storage cavity 202 by sliding the folding ramp assemblies 230 towards the rear of the pickup truck 900. In some embodiments, the left side brace 280 and the right side brace 282 may be stored under the cavity cover 210 and must be removed from the ramp storage cavity 202 prior to removing the folding ramp assemblies 230. The folding ramp assemblies 230 may be unfolded and the left side brace 280 and the right side brace 282 may slide onto the sides of each of the folding ramp assembly 230 to form the left ramp 220 and the right ramp 222. The left ramp 220, the right ramp 222, or both may be positioned between the ground and the tailgate 200 with the Z-bracket 260 resting on the tailgate 200. The cargo may be moved into or out of the truck bed 902 over the left ramp 220 and/or the right ramp 222.

The left ramp 220 and the right ramp 222 may be prepared for storage by removing the left side brace 280 and the right side brace 282 and by folding the folding ramp assemblies 230. The folding ramp assemblies 230 may be slid into the ramp storage cavity 202. In some embodiments, the left side brace 280 and the right side brace 282 may also be placed into the ramp storage cavity 202. The cavity cover 210 may be closed and the tailgate 200 may be moved to the raised position 216.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "accordion fold" may be a pleated structure that resembles the bellows of an accordion.

As used herein, "all-terrain vehicle" or ATV may refer to a wheeled, powered vehicle that is intended primarily for off-road use. The driver of an ATV may straddle the center of the vehicle. An ATV may comprise low-pressure tires that are designed to provide traction and not sink in to soft terrain. ATVs may also be called quads, quadricycles, and four-wheelers.

As used in this disclosure, a "brace" may be a structural element that is used to support or otherwise steady an object.

As used in this disclosure, "cargo" may refer to one or more objects that are intended to be transported using a vehicle.

As used in this disclosure, a "cavity" may be an empty space or negative space that is formed within an object.

As used herein, the words "couple", "couples", "coupled" or "coupling", may refer to connecting, either directly or indirectly, and does not necessarily imply a mechanical connection.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hinge" may be a device that permits the turning, rotating, or pivoting of a first object relative to a second object.

As used in this disclosure, the word "lateral" may refer to the sides of an object or movement towards a side. Lateral directions are generally perpendicular to longitudinal directions. "Laterally" may refer to movement in a lateral direction.

As used herein, the word "longitudinal" or "longitudinally" may refer to a lengthwise or longest direction.

As used in this disclosure, a "pickup truck" may be a vehicle having an enclosed cab and an open body comprising low sides and a tailgate. The vehicle may be powered by an internal combustion engine.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used herein, "rigid" may refer to an object or material which is inflexible. A rigid object may break if sufficient force is applied to the object.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tailgate ramp comprising:
   a tailgate, a left ramp, and a right ramp;
   wherein the left ramp and the right ramp are operable to form inclined planes extending from the ground to a truck bed of a pickup truck or from the ground to the tailgate of the pickup truck;
   wherein a cargo is moved between the pickup truck and the ground by advancing the cargo over the left ramp and the right ramp;
   wherein folding ramp assemblies of the left ramp and the right ramp are folded and stored within a ramp storage cavity of the tailgate when not in use;
   wherein the folding ramp assemblies of the left ramp and the right ramp are removed from the tailgate and unfolded for use;
   wherein an individual ramp selected from the left ramp and the right ramp is positioned with a Z-bracket resting on the pickup truck and the end of the individual ramp that is opposite the Z-bracket resting on the ground.

2. The tailgate ramp according to claim 1
   wherein the tailgate comprises the ramp storage cavity and a cavity cover;
   wherein the tailgate is a pivoting rear wall of the truck bed;
   wherein the tailgate hinges between a raised position and a lowered position.

3. The tailgate ramp according to claim 2
   wherein the ramp storage cavity is a plenum within the tailgate for storing the left ramp and the right ramp;
   wherein the ramp storage cavity opens at the top of the tailgate.

4. The tailgate ramp according to claim 3
   wherein the folding ramp assemblies of both the left ramp and the right ramp fit within the ramp storage cavity defined by a cavity height, a cavity width, and a cavity depth.

5. The tailgate ramp according to claim 4
   wherein the cavity height is at least as high as a ramp height of the folding ramp assembly when the folding ramp assembly is folded, the cavity width is at least twice as wide as a ramp width of the folding ramp assembly, and the cavity depth is at least as deep as a ramp depth.

6. The tailgate ramp according to claim 4
   wherein the cavity height is at least as high as the ramp height of the folding ramp assembly when the folding ramp assembly is folded, the cavity width is at least twice as wide as the ramp depth plus a Z-bracket overhang distance, and the cavity depth is at least as deep as the ramp width of the folding ramp assembly.

7. The tailgate ramp according to claim 4
   wherein the cavity cover encloses the open end of the ramp storage cavity to retain the folding ramp assembly of the left ramp and the folding ramp assembly of the right ramp within the tailgate;

wherein the cavity cover hingedly couples to the tailgate via a cover hinge.

8. The tailgate ramp according to claim 7 wherein the left ramp and the right ramp are used individually or together to create a pathway for moving the cargo between the ground and the pickup truck.

9. The tailgate ramp according to claim 7 wherein the individual ramp comprises the folding ramp assembly, a left side brace, and a right side brace;
wherein the left side brace and the right side brace are longitudinally coupled to opposing sides of the folding ramp assembly, once unfolded, to form the individual ramp.

10. The tailgate ramp according to claim 9 wherein the individual ramp has an unfolded length that is at least twice the vertical distance from the truck bed to the ground.

11. The tailgate ramp according to claim 9 wherein the unfolded length of the left ramp and the right ramp are the same.

12. The tailgate ramp according to claim 9 wherein the folding ramp assembly comprises a plurality of ramp sections, a plurality of ramp hinges, and the Z-bracket;
wherein the folding ramp assembly is accordion folded for storing and unfolded for use.

13. The tailgate ramp according to claim 12 wherein the plurality of ramp sections are rectangular plates of a rigid material that are coupled, end-to-end, by the plurality of ramp hinges;
wherein the width of the plurality of ramp sections determines the ramp width;
wherein the combined thickness of the plurality of ramp sections determines the ramp height when the individual ramp is folded;
wherein the longitudinal length of the plurality of ramp sections determines the ramp depth when the individual ramp is folded.

14. The tailgate ramp according to claim 13 wherein the longitudinal length of individual sections of the plurality of ramp sections match the ramp depth except that the top most of the plurality of ramp sections is shortened by the Z-bracket overhang distance.

15. The tailgate ramp according to claim 13 wherein the plurality of ramp hinges pivot through 180 degrees;
wherein the plurality of ramp hinges are located on alternating sides of the joints between adjacent ramp sections such that the folding ramp assembly accordion folds.

16. The tailgate ramp according to claim 15 wherein the Z-bracket couples to the upper end of the folding ramp assembly using Z-bracket fasteners;
wherein one end of the Z-bracket extends beyond the folding ramp assembly to provide a support for resting the individual ramp on the truck bed.

17. The tailgate ramp according to claim 16 wherein the Z-bracket fasteners are carriage bolts.

18. The tailgate ramp according to claim 16 wherein the left side brace and the right side brace are rigid C-channels that couple to the sides of the folding ramp assembly to prevent collapse of the individual ramp;
wherein a length of an individual brace selected from the left side brace and the right side brace is at least 90 percent of the longitudinal length of the folding ramp assembly when the folding ramp assembly is unfolded;
wherein the left side brace and the right side brace are pressed onto the sides of the folding ramp assembly such that the sides of the folding ramp assembly are inserted into an interior of the channels on both sides.

19. The tailgate ramp according to claim 18 wherein the left side brace and the right side brace are stored within the ramp storage cavity between the cavity cover and the folding ramp assemblies, with the left side brace and the right side brace oriented laterally from one side of the pickup truck to the other side of the pickup truck.

* * * * *